(12) United States Patent
Hehnke

(10) Patent No.: US 6,505,616 B2
(45) Date of Patent: Jan. 14, 2003

(54) STARTING MECHANISM

(75) Inventor: Matthias Hehnke, Schorndorf-Miedelsbach (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/757,024

(22) Filed: Jan. 8, 2001

(65) Prior Publication Data

US 2001/0007251 A1 Jul. 12, 2001

(30) Foreign Application Priority Data

Jan. 7, 2000 (DE) .......................... 100 00 359

(51) Int. Cl.$^7$ ............................... F02M 23/10
(52) U.S. Cl. ...................... 123/588; 123/585
(58) Field of Search ................. 123/588, 585

(56) References Cited

U.S. PATENT DOCUMENTS 2,796,838 A * 6/1957 Phillips .......... 123/DIG. 5
4,163,434 A * 8/1979 Tsukamoto et al. .... 123/119 D

FOREIGN PATENT DOCUMENTS

EP 0262491 4/1988

\* cited by examiner

*Primary Examiner*—Tony M. Argenbright
*Assistant Examiner*—Katrina B. Harris
(74) *Attorney, Agent, or Firm*—R W Becker & Associates; R W Becker

(57) ABSTRACT

A starting mechanism is provided for an internal combustion engine, and includes a diaphragm carburetor. A butterfly valve is disposed in the intake channel of the carburetor and has a pivot range into which at least one fuel nozzle opens. A starter valve is disposed in the intake channel upstream of a Venturi section thereof. A by-pass conduit is provided for additional air supply when the starter valve is closed, and branches off upstream thereof and opens out into a fuel/air mixture path downstream thereof. The control element determines the rate of air flow in the by-pass conduit, and is adjusted by a temperature sensor that is disposed directly on the internal combustion engine.

17 Claims, 2 Drawing Sheets

STARTING MECHANISM

BACKGROUND OF THE INVENTION

The present invention relates to a starting mechanism for an internal combustion engine having a diaphragm carburetor which has an intake channel that communicates with an intake port of the internal combustion engine, with the intake channel having a Venturi section. A butterfly valve is disposed in the intake channel and has a pivot range into which at least one fuel nozzle opens. A starter valve is disposed upstream of the Venturi section. For an additional air supply when the starter valve is closed, a by-pass conduit is provided, the rate of air flow of which is determined by a control element that is adjustable as a function of temperature.

A starting mechanism of this general type is known from EP-0 262 491 A 2. Formed in the housing of the diaphragm carburetor is an intake passage that is connected with the intake port of an internal combustion engine. Disposed in the intake passage, in the vicinity of a Venturi section, is a primary fuel nozzle, while in the pivot range of a butterfly valve that is disposed downstream of the Venturi section an idling nozzle opens. Upstream of the Venturi section is a starter valve, in which is formed a by-pass conduit for supplying air for combustion when the starter valve is closed. The by-pass conduit is controlled by a bimetal element that as a function of the ambient temperature in the intake passage of the diaphragm carburetor controls the rate of air flow in the by-pass conduit.

The starting of such gasoline-operated internal combustion engines, which are utilized as drive motors in manually guided implements such as power chainsaws, cut-off machines, brush cutters, blowers, or the like, requires the use of a rope pull, which is supposed to ensure a starting of the internal combustion engine after only a few pulls. It has been shown that with a position of the choke valve as designed, a starting of the internal combustion engine is ensured. However, when accelerating the engine at idling speed, an overly rich mixture can occur which in many cases can result in the engine dying. If a generally two-stroke or four-stroke engine has died due to the fuel mixture being too rich, it is often difficult for an inexperienced user to again start the engine up. With the known temperature-control regulation of the cross-sectional flow area of the by-pass conduit, although a metering of the air for combustion that is adapted to the temperature is ensured, the underpressure in the intake channel of the diaphragm carburetor also fluctuates with the alteration of the cross-sectional flow area of the by-pass conduit in the starter valve, which results in reactive effects upon the fuel supply.

It is therefore an object of the present invention to improve a starting mechanism of the aforementioned type for an internal combustion engine having a diaphragm carburetor in such a way that a reliable starting and continuous running of the internal combustion engine is ensured over a large temperature range without manual intervention from a user.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
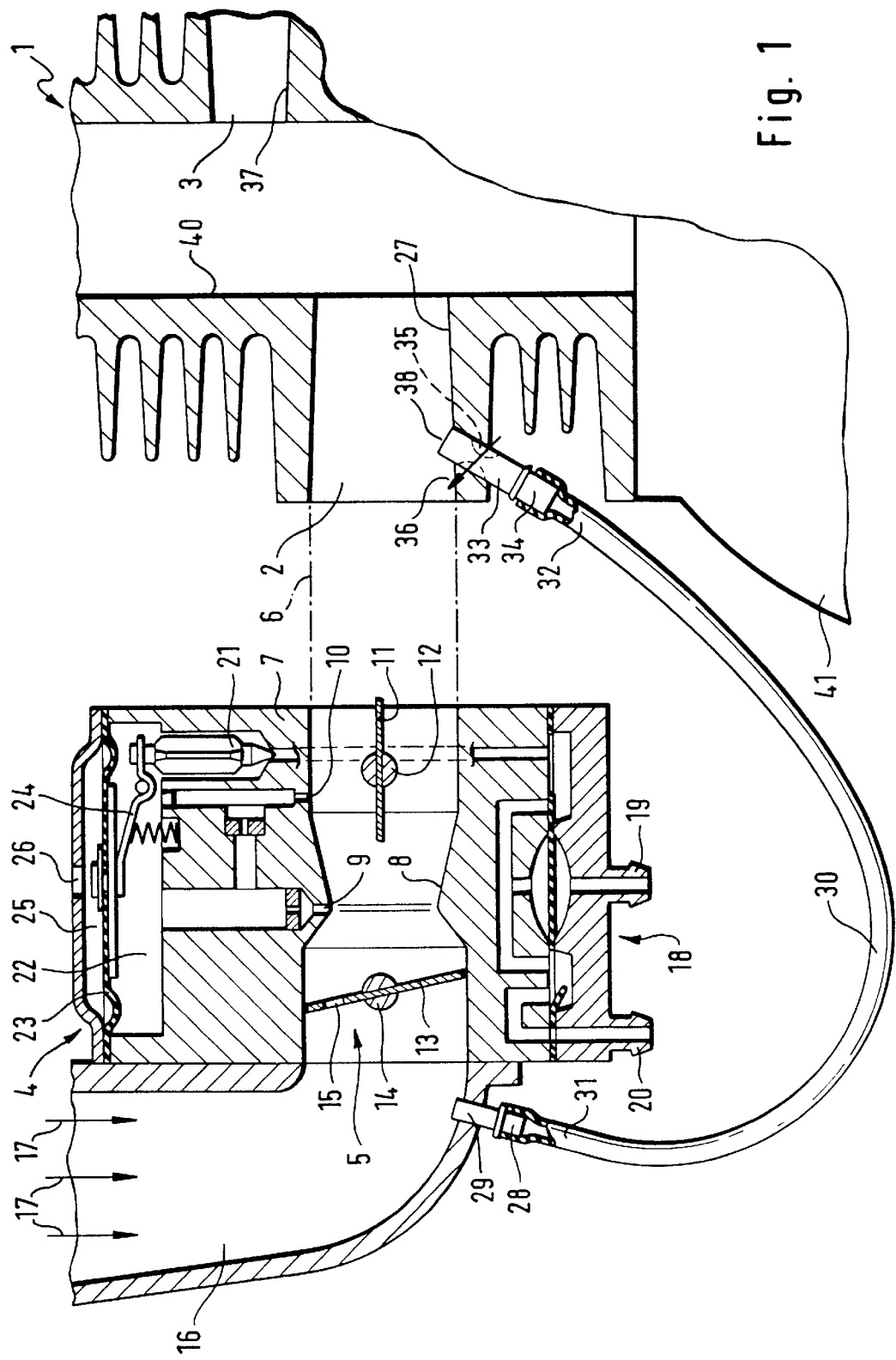
FIG. 1 shows one exemplary embodiment of an inventive starting mechanism for an internal combustion engine that is coupled with a diaphragm carburetor.

The starting mechanism of the present invention is characterized primarily in that the by-pass conduit branches off upstream of the starter valve, while downstream of the starter valve it opens out into a fuel/air mixture path, and in that the control element is adjustable by means of a temperature sensor that is disposed directly on the internal combustion engine.

Since the by-pass conduit branches off upstream of the starter valve, and downstream thereof opens out into the fuel/air mixture path, the choking out conditions in the vicinity of the Venturi section in the intake channel are directly dependent upon the quantity of air flowing via the by-pass conduit. The fuel supply will therefore be appropriately established, so that an alteration of the mixture composition is achieved by the alteration of the rate of air flow in the by-pass conduit. Such an alteration of the mixture composition to adapt to the starting conditions at the existing ambient temperatures is easy to manage and ensures reliable starting relationships, even under extreme conditions.

For example, it is inventively provided that the control element that regulates the rate of air flow through the by-pass conduit is adjusted by a temperature sensor that is disposed directly on the internal combustion engine. Thus, to determine the starting mixture, the temperature that exists at the internal combustion engine is taken into account, namely an approximation of the concrete temperature of the wall of the combustion chamber. For this purpose, it is expedient to dispose the temperature sensor on the cylinder of the internal combustion engine; it can also be sufficient to provide the temperature sensor on the crankcase housing of the internal combustion engine, although preferably close to the cylinder.

The by-pass conduit expediently opens into the intake channel, whereby to reduce the mounting expense, the temperature sensor and the control element are disposed where the by-pass conduit opens out. This opening-out of the by-pass conduit is in particular formed by a tubular section of heat conductive material.

It can however, also be advantageous to dispose the control element between where the by-pass element branches off and where it opens out, whereby the temperature sensor can then be disposed at any expedient location, for example in the wall of the exhaust port. This also provides the possibility of allowing the by-pass to open out between the starter valve and the butterfly valve.

The configuration of the control element, which is adjustable as a function of temperature, should be such that the by-pass conduit is continuously closed below a lower threshold temperature, and is continuously opened above an upper threshold temperature. In the range between the lower and the upper threshold temperatures, the cross-sectional flow area of the by-pass conduit is regulated, whereby the temperature range can be between approximately $-10°$ C. and $+10°$ C.

The by-pass conduit can expediently be closed off by a mechanical valve in order, for example when the starter valve is opened, to completely close off the by-pass conduit by means of the starter valve shaft. This reliably avoids reactive effects of the by-pass conduit during a normal operating state.

Further specific features of the present invention will be described in detail subsequently.

DESCRIPTION OF PREFERRED EMBODIMENTS

Referring now to the drawings in detail, FIG. 1 schematically illustrates an internal combustion engine 1 that has an intake port 2 and an exhaust port 3. The intake channel 5 of a diaphragm carburetor 4 is coupled or communicates with the intake port 2, with the communication being effected by an intermediate piece 6 that in particular is elastic and/or thermally insulated. The intake channel 5 is formed in the housing 7 of the carburetor and is provided with a Venturi section 8, in the region of which a primary fuel nozzle 9 opens. Downstream of the Venturi section 8 an idling nozzle 10 opens out into the intake channel 5; the idling nozzle 10 is disposed in the pivot range of a butterfly valve 11 that is disposed downstream of the Venturi section 8. By means of a shaft 12, the butterfly valve 11 is pivotably mounted in the intake channel 5; in FIG. 1, the butterfly valve 11 is illustrated in the full throttle position, i.e. is completely opened.

Upstream of the Venturi section 8, preferably in the intake channel 5, there is provided a starter valve 13 that, like the butterfly valve 11, is pivotably held in the intake channel 5 by means of a shaft 14. In the illustrated embodiment, the starter valve 13 is provided with an air window or opening 15 through which, when the starter valve 13 is closed, the air for combustion that is necessary during operation of the internal combustion engine 1 flows in.

In the embodiment illustrated in FIG. 1 the starter valve 13 is shown in the starting position in which it substantially entirely closes off the cross-sectional area of the intake channel 5 so that admission of air is possible only via the air opening 15. It can be expedient, in addition to or in place of the air opening 15, to provide the edge region of the starter or choke valve 13 with play relative to the peripheral wall of the intake channel 5, so that in the illustrated closed position of the starter valve 13, the admission of air in the desired quantity is ensured by a gap between the edge of the starter valve 13 and the wall of the intake channel 5.

Connected upstream of the intake channel 5 is an air channel 16 that communicates with a non-illustrated air filter. The air for combustion flows in the direction of the arrows 17 through the air channel 16 to the diaphragm carburetor 4; depending upon the position of the starter valve 13 and of the butterfly valve 11, fuel is mixed with the air for combustion in the region of the fuel nozzles 9 and 10. This fuel/air mixture is supplied via the intermediate piece 6 to the intake port 2 of the internal combustion engine 1.

The fuel that enters the intake channel 5 via the fuel nozzles 9 and 10 is supplied via a fuel pump 18, which is formed in the carburetor housing 7. The fuel pump 18 is driven by the fluctuating crankcase pressure which is supplied via the connector 19 to the pump chamber. The fuel is drawn in via the intake connection 20 and is conveyed via a membrane-controlled feed valve 21 into a control chamber 22, from which are supplied not only the primary nozzle 9 but also the idling nozzle 10. The control chamber 22 is delimited by a diaphragm 23 that controls the feed valve 21 via a spring-loaded lever 24.

For compensation with the ambient air pressure, the control diaphragm 23 is acted upon by ambient air pressure on that side that faces away from the control chamber 22; for this purpose, a compensation chamber 25, which is vented to the atmosphere via an opening 26, is formed on the dry side of the control diaphragm 23.

The setting of the mixture in the illustrated starting position of the choke and butterfly valves (choke valve 13 closed; butterfly valve 11 opened) is such that in a temperature range of about –20 to –30° C., a starting and continuous running of the internal combustion engine is ensured without intervention by a user.

To adapt the mixture to the ambient temperature, the starting mechanism of the present invention is provided with a by-pass conduit 30, which in the illustrated embodiment is in the form of a hose. The one end 31 of the by-pass conduit 30 is connected to a branch element 29, which extends from the air channel 16, preferably close to the carburetor housing 7. In the illustrated embodiment, the end 31 of the hose is pushed onto an attachment portion 28 of the branch element 29.

The other, second end 32 of the by-pass conduit 30 is connected to a tubular section 33 that projects out of the wall 27 of the intake port 2. For the connection to a by-pass conduit 30 that is embodied as a hose, the tubular section 33 is provided with an attachment end 34 upon which the end of the hose can be pushed.

In FIG. 1, the tubular section 33, which is held in the wall 27 of the intake port 2, is provided with a control element 35 that is adjustable by a temperature sensor 36. It can be expedient, as illustrated in FIG. 1, for the control element 35 and the temperature sensor 36 to be a single piece, for example being embodied in the form of a bimetal adjustment element. Since the temperature sensor 36 is disposed on the internal combustion engine 1, namely in the wall of the cylinder 40 thereof, the operating temperature of the internal combustion engine 1 is sensed and is taken into account during the metering of the by-pass air. If the temperature sensor 36, as illustrated, is disposed in the wall 27 of the intake port 2, its temperature is used directly to control the by-pass air, so that the temperature conditions are detected along the mixture path. It can be taken into account if with a cold engine an increased fuel quantity condenses upon the wall of the mixture path, or with a warm engine such condensation hardly occurs.

The air passage through the by-pass conduit 30 is advantageously set such that the temperature sensor 36 holds the control element 35 permanently closed at cylinder temperatures of, for example, less than –10° C. whereas in a temperature range of, for example, –10° to +10° C. cylinder temperature the control element opens to a greater or lesser degree as a function of the actual cylinder temperature. Above a cylinder temperature of, for example, 10° C. the control element 35 completely releases the flow path of the by-pass conduit 30, so that the by-pass conduit is completely opened without hindrance by the control element.

By controlling the air admission through the by-pass conduit 30 as a function of the cylinder temperature, a reliable starting of the internal combustion engine and a continuous running thereof is ensured in a temperature range of about –30° C. to +50° C. without manual intervention by an operator.

Figures 2, 3:
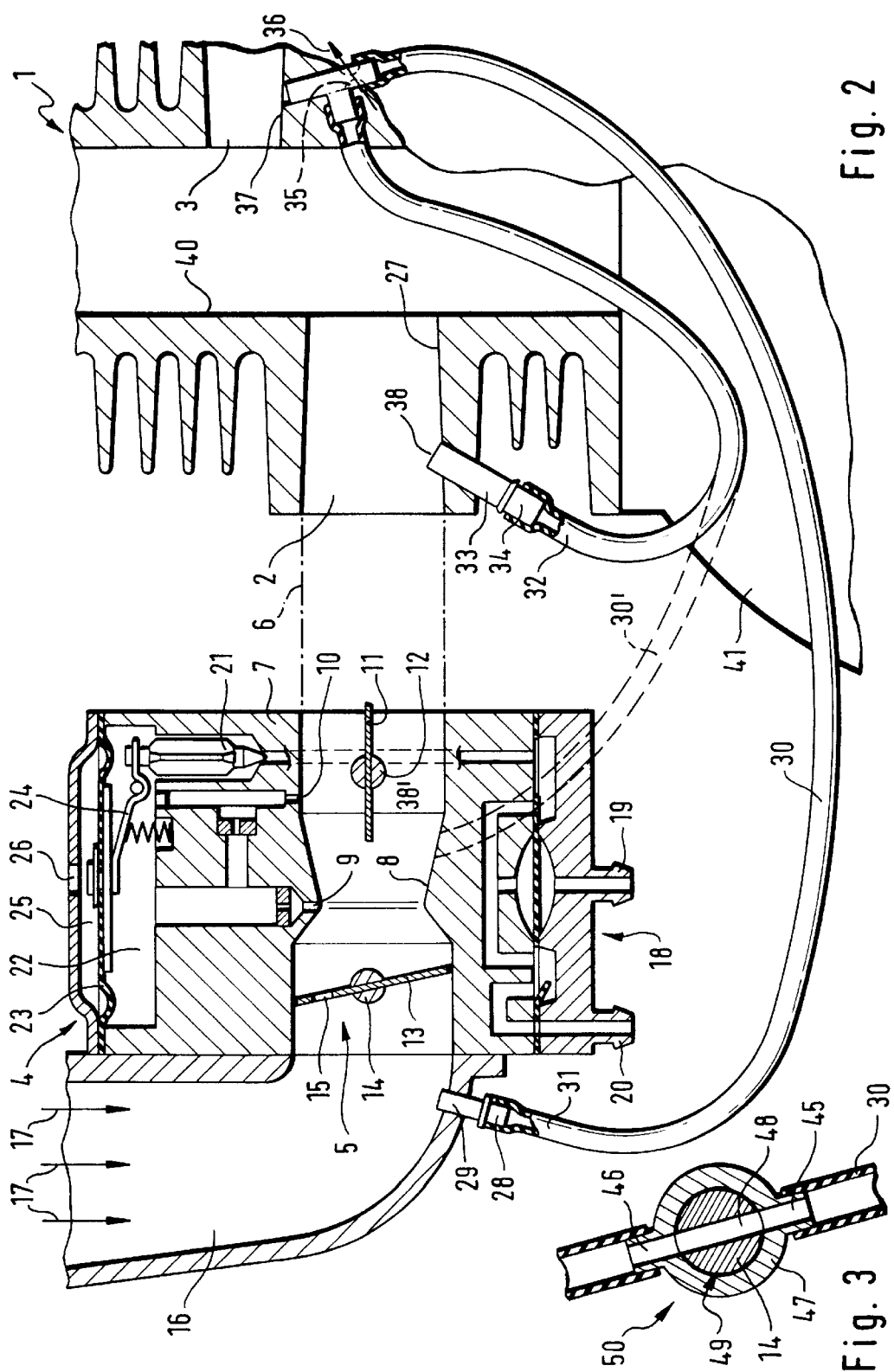
FIG. 2 shows a modified embodiment of the starting mechanism of FIG. 1.
FIG. 3 is a cross-sectional view through a mechanical shutoff valve.

The embodiment illustrated in FIG. 2 shows a similar starting mechanism to that of FIG. 1, for which reason the same reference numerals are used for the same parts.

The embodiment of FIG. 2 differs from that of FIG. 1 in that the temperature sensor 36 is disposed in the wall 37 of the exhaust port 3, so that the metering of the by-pass air can be effected as a function of the exhaust gas temperature. In this connection, the temperature sensor 36 acts upon the control element 35, which is located close to it, and in particular between the branch of the by-pass conduit 30 and where it opens out at 38 into the intake port 2.

It can also be expedient to dispose the temperature sensor at the crankcase housing 41.

Another advantageous arrangement is to have the by-pass conduit 30' open out as 38' in the passage section between the starter valve 13 and the butterfly valve 11. This reliably precludes an influence of the by-pass conduit in full throttle and idle.

It can also be expedient to be able to close off the by-pass conduit 30 with a mechanical valve 50, as shown in FIG. 3. The valve member 49 is advantageously formed by the shaft 14 of the starter valve 13, which shaft is guided in a valve housing 47; the shaft 14 has a radial valve bore 48 that in the illustrated open position of the valve 50 is aligned with connection openings 45, 46 of the valve housing. In the non-operative position of the starter valve 13, the shaft 14 is rotated by 90° so that the valve bore 48 is closed off by the wall of the valve housing 47. In the open position of the starter valve 13, the by-pass conduit 30 is closed off; reactive effects of the by-pass conduit under operating conditions beyond the starting situation are precluded.

Shifting of the mechanical valve 50 can expediently also be effected by a separate, especially external, start switch. A functional coupling of the valve member 49 or of the switch with the starter linkage is also advantageous.

The specification incorporates by reference the disclosure of German priority document 100 00 359.1 of Jan. 7, 1999.

The present invention is, of course, in no way restricted to the specific disclosure of the specification and drawings, but also encompasses any modifications within the scope of the appended claims.

I claim:

1. A starting mechanism for an internal combustion engine, comprising:
   a diaphragm carburetor, which has an intake channel for communicating with an intake port of an internal combustion engine, wherein said intake channel has a Venturi section, wherein a butterfly valve is disposed in said intake channel and has a pivot range into which at least fuel nozzle opens, and wherein a starter valve is disposed in said intake channel upstream of said Venturi section;
   a by-pass conduit for an additional air supply when said starter valve is closed, wherein said by-pass conduit branches off upstream of said starter valve and downstream of said starter valve opens out into a fuel/air mixture path;
   a control element for determining a rate of air flow in said by-pass conduit, wherein said control element is adjustable as a function of temperature; and
   a temperature sensor for adjusting said control element, wherein said temperature sensor is adapted to be disposed directly on said internal combustion engine.

2. A starting mechanism according to claim 1, wherein said temperature sensor is disposed on a cylinder of said internal combustion engine, in a wall of an exhaust port of said internal combustion engine, or in a muffler connected to said exhaust port.

3. A starting mechanism according to claim 2, wherein said temperature sensor is disposed in a wall of said intake port of said internal combustion engine.

4. A starting mechanism according to claim 1, wherein downstream of said butterfly valve, said by-pass conduit opens out into said fuel/air mixture path.

5. A starting mechanism according to claim 4, wherein said by-pass conduit opens out into said intake port of said internal combustion engine.

6. A starting mechanism according to claim 4, wherein said temperature sensor and said control element are disposed where said by-pass conduit opens out.

7. A starting mechanism according to claim 6, wherein the area where said by-pass conduit opens out is formed by a tubular section of heat conducting material.

8. A starting mechanism for an internal combustion engine, comprising:
   a diaphragm carburetor, which has an intake channel for communicating with an intake port of an internal combustion engine, wherein said intake channell has a Venturi section, wherein a butterfly valve is disposed in said intake channel and has a pivot range into which at least one fuel nozzle opens, and wherein a starter valve is disposed in said intake channel upstream of said Venturi section;
   a by-pass conduit for an additional air supply when said starter valve is closed, wherein said by-pass conduit branches off upstream of said starter valve, and downstream of said starter valve opens out into a fuel/air mixture path;
   a control element for determining a rate of air flow in said by-pass conduit, wherein said control element is adjustable as a function of temperature; and
   a temperature sensor for adjusting said control element, wherein said temperature sensor is disposed on a crankcase housing of said internal combustion engine.

9. A starting mechanism according to claim 8, wherein said temperature sensor is disposed close to a cylinder of said internal combustion engine.

10. A starting mechanism for an internal combustion engine, comprising:
    a diaphragm carburetor, which has an intake channel for communicating with an intake port of an internal combustion engine, wherein said intake channel has a Venturi section, wherein a butterfly valve is disposed in said intake channel and has a pivot range into which at least one fuel nozzle opens, and wherein a starter valve is disposed in said intake channel upstream of said Venturi section;
    a by-pass conduit for an additional air supply when said starter valve is closed, wherein said by-pass conduit branches off upstream of said starter valve, and downstream of said starter valve opens out into a fuel/air mixture path, and wherein said by-pass conduit opens out between said starter valve and said butterfly valve in said fuel/air mixture path;
    a control element for determining a rate of air flow in said by-pass conduit, wherein said control element is adjustable as a function of temperature; and
    a temperature sensor for adjusting said control element, wherein said temperature sensor is adapted to be disposed directly on said internal combustion engine.

11. A starting mechanism for an internal combustion engine, comprising:
    a diaphragm carburetor, which has an intake channel for communicating with an intake port of an internal combustion engine, wherein said intake channel has a Venturi section, wherein a butterfly valve is disposed in said intake channel and has a pivot range into which at least one fuel nozzle opens, and wherein a starter valve is disposed in said intake channel upstream of said Venturi section;
    a by-pass conduit for an additional air supply when said starter valve is closed, wherein said by-pass conduit branches off upstream of said starter valve, and downstream of said starter valve opens out into a fuel/air mixture path;

a control element for determining a rate of air flow in said by-pass conduit, wherein said control element is adjustable as a function of temperature, and wherein said control element is disposed between where said by-pass conduit branches off and where it opens out; and a temperature sensor for adjusting said control element, wherein said temperature sensor is adapted to be disposed directly on said internal combustion engine.

12. A starting mechanism for an internal combustion engine, comprising:

a diaphragm carburetor, which has an intake channel for communicating with an intake port of an internal combustion engine, wherein said intake channel has a Venturi section, wherein a butterfly valve is disposed in said intake channel and has a pivot range into which at least one fuel nozzle opens, and wherein a starter valve is disposed in said intake channel upstream of said Venturi section;

a by-pass conduit for an additional air supply when said starter valve is closed, wherein said by-pass conduit branches off upstream of said starter valve, and downstream of said starter valve opens out into a fuel/air mixture path, and wherein below a lower threshold temperature said by-pass conduit is completely closed, and wherein above an upper threshold temperature said by-pass conduit is completely opened;

a control element for determining a rate of air flow in said by-pass conduit, wherein said control element is adjustable as a function of temperature; and a temperature sensor for adjusting said control element, wherein said temperature sensor is adapted to be disposed directly on said internal combustion engine.

13. A starting mechanism according to claim 12, wherein a cross-sectional flow area of said by-pass conduit is regulated in a temperature range between said upper and lower threshold temperatures.

14. A starting mechanism according to claim 13, wherein said temperature range is between approximately −10° C. and +10° C.

15. A starting mechanism for an internal combustion engine, comprising:

a diaphragm carburetor, which has an intake channel for communicating with an intake port of an internal combustion engine, wherein said intake channel has a Venturi section, wherein a butterfly valve is disposed in said intake channel and has a pivot range into which at least one fuel nozzle opens, and wherein a starter valve is disposed in said intake channel upstream of said Venturi section;

a by-pass conduit for an additional air supply when said starter valve is closed, wherein said by-pass conduit branches off upstream of said starter valve, and downstream of said starter valve opens out into a fuel/air mixture path, and wherein a further valve is disposed in said by-pass conduit, wherein said further valve is mechanically controlled by a shaft of one of said previously mentioned valves, and wherein said further valve is closed in a predetermined position of said aforementioned valve;

a control element for determining a rate of air flow in said by-pass conduit, wherein said control element is adjustable as a function of temperature; and a temperature sensor for adjusting said control element, wherein said temperature sensor is adapted to be disposed directly on said internal combustion engine.

16. A starting mechanism according to claim 15, wherein said further valve has a valve member formed by said shaft of said aforementioned valve, and wherein said shaft has a radial valve bore and is rotatably held in a valve housing.

17. A starting mechanism according to claim 15, wherein said aforementioned valve is said starter valve, and wherein said further valve is closed in an open position of said starter valve.

* * * * *